United States Patent
Imai

(10) Patent No.: US 8,174,242 B2
(45) Date of Patent: May 8, 2012

(54) APPARATUS AND METHOD FOR PRE-CHARGING IN CHARGING/DISCHARGING EQUIPMENT FOR AN ENERGY-STORAGE DEVICE

(75) Inventor: Takashi Imai, Kyoto (JP)

(73) Assignees: IKS Co., Ltd., Kyoto (JP); IKS USA, Inc., Charlotte, NC (US)

( * ) Notice: Subject to any disclaimer, the term of this patent is extended or adjusted under 35 U.S.C. 154(b) by 1063 days.

(21) Appl. No.: 12/100,582

(22) Filed: Apr. 10, 2008

(65) Prior Publication Data
US 2009/0256526 A1    Oct. 15, 2009

(51) Int. Cl.
*H02J 7/00* (2006.01)
(52) U.S. Cl. .......................... 320/138; 324/430
(58) Field of Classification Search .................. 320/136, 320/138, 149
See application file for complete search history.

(56) References Cited

U.S. PATENT DOCUMENTS

| | | | |
|---|---|---|---|
| 5,952,815 A | 9/1999 | Rouillard et al. | |
| 6,239,580 B1 | 5/2001 | Toya | |
| 6,373,226 B1 | 4/2002 | Itou et al. | |
| 6,838,857 B2 | 1/2005 | Faure et al. | |
| 7,835,119 B2 * | 11/2010 | Florence et al. | 361/18 |
| 2002/0011820 A1 | 1/2002 | Suzuki et al. | |
| 2006/0158168 A1 * | 7/2006 | Yoshida et al. | 323/282 |
| 2008/0100298 A1 * | 5/2008 | Yun et al. | 324/430 |

FOREIGN PATENT DOCUMENTS

| | | |
|---|---|---|
| EP | 0 851 556 A | 7/1998 |
| EP | 1 641 099 A | 3/2006 |
| GB | 2 313 497 A | 11/1997 |
| WO | WO 99/05767 A | 2/1999 |
| WO | WO 02/067281 | 8/2002 |
| WO | WO 2007/128876 A1 | 11/2007 |

OTHER PUBLICATIONS

International Search Report for International Application No. PCT/US2008/080599.

* cited by examiner

*Primary Examiner* — Huy Q Phan
*Assistant Examiner* — Temilade S Rhodes-Vivour
(74) *Attorney, Agent, or Firm* — Smith Moore Leatherwood LLP

(57) ABSTRACT

An apparatus includes a switching circuit operable with an arrangement configured to effectuate a charging or discharging of an energy-storage device to a circuit including electrically-parallel condenser. The switching circuit includes a main switch electrically connectable to the condenser, and a control circuit electrically connected in parallel with the main switch, and electrically connectable to the condenser. The main switch and control circuit are each configured to independently, switchably pass current from the energy-storage device to the condenser and a power load/source. In this regard, the main switch and control circuit are controllable to pass current from the energy-storage device to the power load, and in a manner whereby current from the energy-storage device to the condenser is diverted from passing through the main switch for a period during which a voltage disparity between the condenser and energy-storage device decreases to within a predetermined range.

24 Claims, 2 Drawing Sheets

APPARATUS AND METHOD FOR PRE-CHARGING IN CHARGING/DISCHARGING EQUIPMENT FOR AN ENERGY-STORAGE DEVICE

FIELD OF THE INVENTION

Embodiments of the present invention generally relate to charging and discharging energy-storage devices such as batteries or capacitors, and more particularly, relate to pre-charging in charging/discharging equipment for energy-storage devices.

BACKGROUND OF THE INVENTION

Rechargeable batteries and capacitors are widely used in many industries, and generally include a group of two or more secondary cells (or secondary batteries, or capacitors). Generally, rechargeable batteries, such as Lithium, Nickel, lead-acid, flow type batteries or the like, and supercapacitors such as double-layer capacitors or the like, require a main switching circuit for charging and/or discharging operations between the respective energy-storage device and a charging/discharging circuit including a power source and/or load. To compensate for switching ripple currents during electric power conversion in the charging/discharging equipment, the charging/discharging circuit may include or be otherwise coupled to large-capacity condensers (capacitors), which may be charged before charging an energy-storage pack including one or more energy-storage devices in order to control ripple current.

Recently high-rate batteries and supercapacitors have been recently developed, and introduced for electric vehicle (EV) and hybrid-electric vehicle (HEV) applications. These high-rate energy-storage devices generally require larger electrical energy during charging or discharging operations, and have a much higher electro-energy density with much lower internal impedance as compared to other batteries and supercapacitors. This higher electro-density with lower internal impedance, however, may undesirably result in an excessively-large initial current when the main switching circuit is engaged under some unpredictable situation between the condensers and high-rate energy-storage devices. And this excessively large initial current may result in sparking and/or burning of switching relay terminals, and may thereby lead to a reduction in the useful life of those relay terminals.

SUMMARY OF THE INVENTION

In light of the foregoing background, exemplary embodiments of the present invention provide an improved apparatus and method for discharging or charging an energy-storage device (battery, capacitor, supercapacitor, etc.). According to one aspect of exemplary embodiments of the present invention, an apparatus is provided that includes a switching circuit operable with an arrangement configured to effectuate a discharging of an energy-storage device to a discharging circuit including a condenser (or a plurality of parallel condensers) electrically connected in parallel with a power load. The switching circuit includes a main switch electrically connectable to a discharging circuit including the condenser and switchably controllable open or closed, where the main switch is configured to pass current from the energy-storage device to the discharging circuit including the condenser when closed.

According to exemplary embodiments of the present invention, the switching circuit further includes a control circuit and a measure/control element. The control circuit includes a second switch and resistive element, and is electrically connected in parallel with the main switch. Similar to the main switch, the second switch is switchably controllable open or closed, where the second switch is configured to pass current from the energy-storage device to the discharging circuit including the condenser when closed. The measure/control element is configured to control the main and second switches to effectuate a charging of the condenser before or in conjunction with discharging the energy-storage device. In this regard, the measure/control element is configured to control the main switch open and the second switch closed for a pre-charge period during which a voltage disparity between the condenser and energy-storage device decreases to within a predetermined range (e.g., safety range), and thereafter close the main switch.

The measure/control element may be configured to measure a voltage across the condenser, and close the main switch when the measured voltage is within the safe range of the energy-storage device voltage. The measure/control element may be configured to open the second switch after the pre-charge period, or alternatively, hold the second switch closed after the pre-charge period. Regardless, however, the switching circuit may be configured to charge initially the condenser, and thereafter discharge the energy-storage device to the power load.

According to other aspects of exemplary embodiments of the present invention, an apparatus for effectuating a charging an energy-storage device is provided, as are associated methods for discharging and charging an energy-storage device. Exemplary embodiments of the present invention therefore provide an improved apparatus and method for charging and/or discharging an energy-storage device. As indicated above, and explained below, exemplary embodiments of the present invention may solve problems identified by prior techniques and provide additional advantages.

BRIEF DESCRIPTION OF THE DRAWINGS

Figure 1:
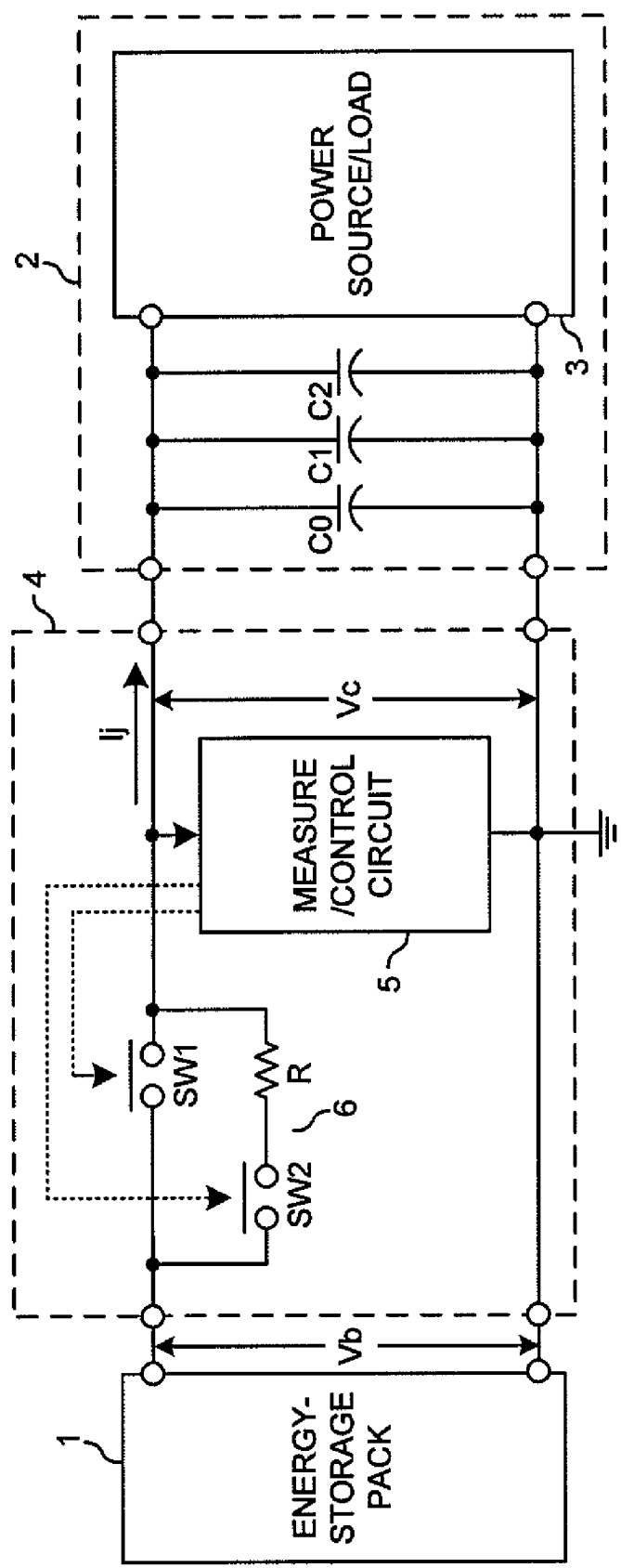
Figure 2:
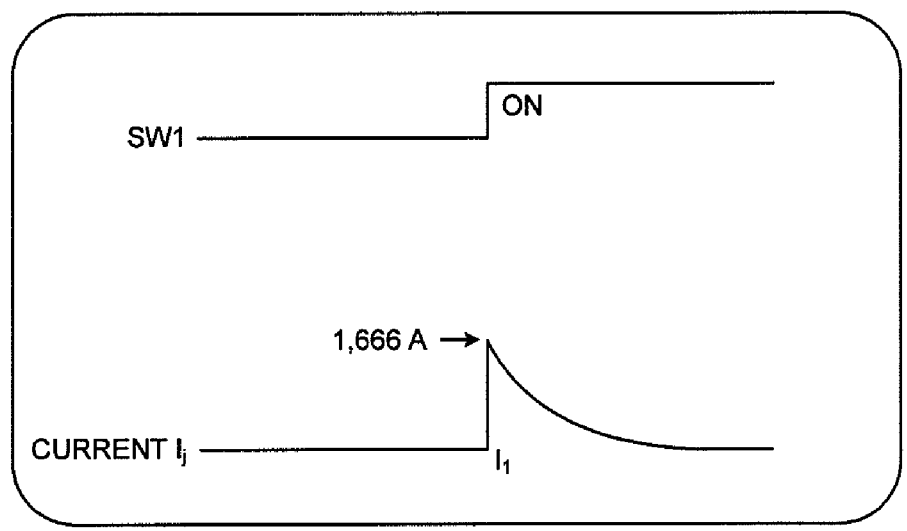
Figure 3:
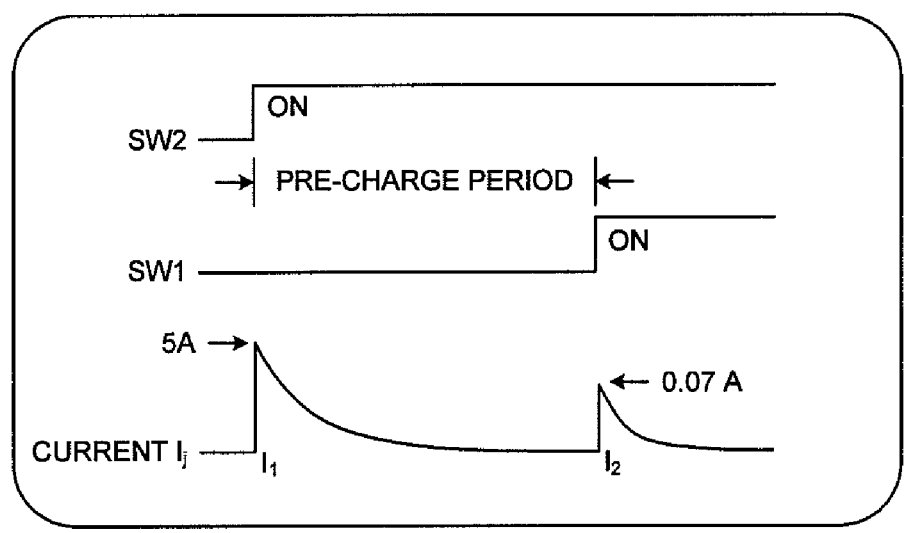

Having thus described the invention in general terms, reference will now be made to the accompanying drawings, which are not necessarily drawn to scale, and wherein:

FIG. 1 is a block diagram of charging/discharging equipment, according to one exemplary embodiment of the present invention; and FIGS. 2 and 3 are graphs illustrating various aspects of charging an energy-storage pack including one or more energy-storage devices, according to exemplary embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with exemplary embodiments of the present invention, charging and/or discharging equipment for energy-storage devices may be configured to charge and/or discharge energy-storage devices such as secondary (rechargeable) batteries, capacitors, supercapacitors or the like, such equipment referred to herein as "charging/discharging equipment." These energy-storage devices may include singular energy-storage devices, or packs including a plurality of serially-connected energy-storage devices (cells). As explained herein, however, a pack may at times refer to a singular energy-storage device.

As shown in FIG. 1, for example, the charging/discharging equipment for an energy-storage pack 1 according to one exemplary embodiment of the present invention may include a charging and/or discharging circuit (shown as charging/discharging circuit 2). The charging/discharging circuit, in turn, may include a power source configured to supply power to the energy-storage pack to thereby charge the energy-storage pack, and/or a power load configured to receive power discharged from the energy-storage pack (the source and/or load being shown as power source/load 3). In addition to the power source/load, the charging/discharging circuit may also include one or more condensers (three condensers C1, C2 and C3 being shown for example) electrically connected in parallel with one another and the power source/load.

Electrically connected in parallel between the energy-storage pack 1 and the charging/discharging circuit 2, the charging/discharging equipment may include a switching circuit 4, which may include a measure/control element 5. Further, between the energy-storage pack and the condensers C1, C2 and C3, the switching circuit may include a main switch SW1, and in parallel with the main switch SW1, one or more pre-charge control circuits 6, each of which may include a switch and resistive element (one pre-charge control circuit being shown for example). As shown, for example, a pre-charge control circuit may include a serially-connected switch SW2 and resistor R. In one example, the energy-storage pack may comprise a 50 V battery pack (Vb≈50 V), the condensers may comprise 0.01 Farad capacitors, and the resistor may comprise a 10 Ohm resistor. Further to the aforementioned example, the energy-storage pack and wiring from the energy-storage pack to the condensers may have a total resistance of 30 milliohms. Generally, the condensers may be sized according to their power output, where a 940 μF condenser may output approximately 50 Watts, a 2,400 μF condenser may output approximately 300 Watts, and a 8,000 μF condenser may output approximately 1,000 Watts.

The measure/control element 5 may include a number of components such as a voltmeter, ammeter and/or processor or other controller, and as explained below, may be configured to measure the voltage Vc across the condensers C1, C2 and C3, and/or the electric current Ij from the energy-storage pack 1. It should be understood, however, that the measure/control element may alternatively be configured to measure or track any of a number of different metrics that may be correlated to the electric current Ij and/or condenser voltage Vc. Regardless of the exact metric measured by the measure/control element, however, the measure/control element may be configured to control the switches SW1 and SW2 based on one or both of those measurements to thereby control charging and/or discharging of the energy-storage pack 1.

More particularly relative to discharge of the energy-storage pack 1, under control of the measure/control element 5, the pre-charge control circuit 6 may be configured to limit current flow from the energy-storage pack 1 to the condensers C1, C2 and C3 of charging/discharging circuit 2 during initial charging of condensers. In this regard, relative to main switch SW1, the pre-charge control circuit may include a resistor R configured to resist current that may otherwise pass from the energy-storage pack through the main switch SW1 to the condensers. At some point during this initial charging of the condensers (following a pre-charge period), then, the measure/control element may close the main switch SW1 for continued charging of the condensers, and subsequent discharging of the energy-storage pack to the power load 3 of the charging/discharging circuit.

In operation, a method of discharging an energy-storage pack 1 may include applying a constant (or approximately constant) current Ij from the energy-storage pack to the power load 3 of the charging/discharging circuit 2. This constant current may be applied in any of a number of manners and under control of any of a number of components arranged and configured to effectuate charging and/or discharging of the power source/load 3. Although not separately shown and described herein, one example of such an arrangement is described in U.S. patent application Ser. No. 11/876,797, entitled: Apparatus and Method for Charging and Discharging Serially-Connected Batteries, filed Oct. 23, 2007, the content of which is hereby incorporated by reference in its entirety.

As the constant current is applied to the power load 3 of the charging/discharging circuit 2, the measure/control element 4 may selectively open or close main switch SW1 and/or switch SW2 to prevent or permit the current to flow across the respective switches to initially charge the condensers. In this regard, presume the measure/control element closes main switch SW1 (permitting current flow) and opens switch SW2 (preventing current flow), or otherwise insures main switch SW1 is closed and switch SW2 is open (or even if pre-charge control circuit 6 is not present). In such instances, if the initial voltage across the condensers C0, C1 and C2 is approximately zero (Vc≈0 V), and the total resistance of the energy-storage pack and wiring from the energy-storage pack to the condensers is relatively low (e.g., 30 milliohms), the current from the energy-storage pack may be relatively high (e.g., Ij≈50 V/0.03 Ohm=1,666 A). And as this relatively high current may damage the closed main switch SW1, the measure/control circuit may first hold main switch SW1 open and switch SW2 closed for a pre-charge period of time to thereby reduce the initial current to the condensers.

In accordance with exemplary embodiments of the present invention, then, the measure/control element 5 may first open main switch SW1 and close switch SW2, or otherwise insure main switch SW1 is open and switch SW2 is closed to initially charge the condensers. Again presume the initial voltage across the condensers C0, C1 and C2 is approximately zero (Vc≈0 V), and the total resistance of the energy-storage pack 1 and wiring from the energy-storage pack to the condensers is relatively low (e.g., 30 milliohms). Now, additionally accounting for the resistor R in series with switch SW2, the current from the energy-storage pack may be relatively low (e.g., Ij=50 V/10.03 Ohm=5 A).

As current is applied from the energy-storage pack 1 to charge the condensers C0, C1 and C2, the measure/control circuit 5 may measure the condenser voltage Vc as it increases from its initial voltage. Then, when the voltage disparity between the condenser Vc and energy-storage pack voltage Vb decreases to within a safety range, the measure control circuit may close main switch SW1, and may open switch SW2 or otherwise hold switch SW2 closed. This safety range may comprise, for example, a range of within approximately 0.1 V of Vb, or within approximately 2.5% of Vb. Continuing an example configuration including a 50 V battery pack (Vb≈50 V), one 0.01 Farad condenser C, 10 Ohm resistor R, and pack/wiring resistance of 30 milliohms. In such an example, after one second, the condenser voltage Vc may approach 49.998 V, i.e., $Vc=Vb \times (1-e^{-1/(R \times C)}) = 50 \times (1-e^{-1/(10.03 \times 0.01)})$, which is within 0.002 V of Vb.

At the point at which switch SW1 is closed, the current from the energy-storage pack 1 may be relatively low, as compared to the case in which switch SW1 is initially closed (e.g., 1,666 A). More particularly, continuing the aforementioned example, if the switch SW1 is closed after one second, the current from the energy-storage pack may be approximately 0.07 A (Ij=(50 V−49.998 V)/0.03 Ohm=0.07 A). This relatively low current may therefore pass through switch SW1 without damaging (or with reduced damage) the respective switch SW1, which may occur in the case in which switch SW1 is initially closed (without a pre-charge period).

Charging of the condensers may then continue until the condensers are fully charged, at which point the energy-storage pack begins to discharge to the power load 3. At the appropriate point in the discharge of the energy-storage pack, then, the appropriate arrangement may cease application of the current Ij from the energy-storage pack to the power load. Again, an example of such an arrangement is described in the aforementioned U.S. patent application Ser. No. 11/876,797.

To determine the appropriate point in the discharge of the energy-storage pack 1, measure/control element 5 may measure the electro-energy capacity (electric charge) of energy-storage pack 1 while multiplying the current Ij times time. Further, the electro-energy capacity can be also calculated by multiplying condenser capacity (predetermined value) times condenser voltage Vc, which may be measured at a time in which the energy-storage pack voltage Vb approximately equals the condenser voltage Vc (or approximately equal to the charge/discharge voltage).

To further illustrate exemplary embodiments of the present invention, reference is made to FIGS. 2 and 3, which illustrate timing diagrams relating the switching of switches SW1 and SW2 to the current Ij. In this regard, FIG. 2 illustrates the exemplary case in which the measure/control element 5 insures main switch SW1 is closed and switch SW2 is open (or even if pre-charge control circuit 5 is not present). In this case, the charging process may initially start with current Ij of approximately 1,666 A, which may damage switching relay terminals in a manner that may substantially shorten the useful life of the switching circuit 4. FIG. 3, on the other hand, illustrates the exemplary case in which the measure/control element closes switch SW2 and opens main switch SW1 for a pre-charge period during which the charging process may initially start with a smaller current Ij of approximately 5 A. Then, when the voltage disparity between the energy-storage pack 1 Vb and condenser Vc reaches decreases to within a safety range, the measure/control element may close the main switch SW1, at which point the current may be small enough to charge the condensers, and in turn discharge the energy-storage pack without damaging the switching circuit or its components.

The exemplary embodiment shown in FIG. 1 and described above has been particularly focused on discharging the energy-storage pack 1. It should be understood, however, that exemplary embodiments of the present invention may be equally applicable to charging the energy-storage pack. In such instances, under control of the measure/control element 5, the pre-charge control circuit 6 may be configured to limit current flow from the charging/discharging circuit 2 (including the power source 3 and condensers C1, C2 and C3) during initial charging of the energy-storage pack. In this regard, relative to main switch SW1, the resistor R of the pre-charge control circuit may resist current that may otherwise pass from the charging/discharging circuit through the main switch SW1 to the energy-storage pack. At some point during this initial charging of the energy-storage pack (following a pre-charge period), then, the measure/control element may close the main switch SW1 for continued charging of the energy-storage pack.

In operation, a method of charging an energy-storage pack 1 may include applying a constant (or approximately constant) current Ij from the charging/discharging circuit 2 to the energy-storage pack, such as under direction of an arrangement such as that described by the aforementioned U.S. patent application Ser. No. 11/876,797. As the constant current is applied to initially charge the energy-storage pack, the measure/control element 4 may selectively open or close main switch SW1 and/or switch SW2 to prevent or permit the current to flow across the respective switches. In this regard, the measure/control element 5 may first open main switch SW1 and close switch SW2, or otherwise insure main switch SW1 is open and switch SW2 is closed. During initial engagement with the charging/discharging circuit (discharging or charging the condensers C1, C2 and C3) to charge the energy-storage pack, the measure/control circuit may measure the condenser voltage Vc as it changes (decreases or increases) from its initial voltage. Then, when the voltage disparity between the energy-storage pack Vb and condenser Vc decreases to within a safety range, the measure control circuit may close main switch SW1, and may open switch SW2 or otherwise hold switch SW2 closed. Similar to before, this safety range may comprise, for example, a range of within approximately 0.1 V of Vc, or within approximately 2.5% of Vc. Charging of the energy-storage pack may then continue until the energy-storage pack is fully charged (or charged to another desirable voltage), at which point the appropriate arrangement may cease application of the constant current to thereby cease charging of the energy-storage pack.

The apparatus and method explained herein may be generally utilized to reduce the likelihood of damaging the main switch SW1 in instances of a relatively large disparity between the energy-storage pack voltage Vb and the condenser voltage Vc. As explained above, this disparity may exist prior to or during discharging an at least partially, if not fully, charged energy-storage pack 1 to at least partially, if not fully, discharged condensers C1, C2 and C3 of charging/discharging circuit 2 (including the power source 3). Similarly, a voltage disparity may exist prior to or during charging an at least partially, if not fully, discharged energy-storage pack by an at least partially, if not fully, charged charging/discharging circuit (including condensers C1, C2 and C3). It should be understood, however, that this disparity may exist in any of a number of other instances, including prior to or during charging an at least partially, if not fully, charged energy-storage pack by an at least partially, if not fully, discharged charging/discharging circuit; as well as prior to or during discharging an at least partially, if not fully, discharged energy-storage pack to an at least partially, if not fully, charged charging/discharging circuit.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   a switching circuit operable with an arrangement configured to effectuate a discharging of an energy-storage device to a discharging circuit including a condenser electrically connected in parallel with a power load, the switching circuit comprising:
a main switch electrically connectable to the condenser;
a control circuit electrically connected in parallel with the main switch, and electrically connectable to the condenser, the main switch and control circuit each being configured to independently, switchably pass current from the energy-storage device to the condenser and power load, the respective current passing through either or both of the main switch or control circuit during the discharging of the energy-storage device,
wherein the main switch and control circuit are controllable to pass current from the energy-storage device to the power load, including being controllable to divert current from the energy-storage device to the condenser from passing through the main switch for a pre-charge period of the discharging of the energy-storage device during which a voltage disparity between the condenser and energy-storage device decreases to within a predetermined range.

2. An apparatus according to claim 1, wherein the control circuit comprises a second switch and resistor.

3. An apparatus according to claim 1, wherein the main switch is electrically connectable to the charging circuit including a plurality of parallel-connected condensers electrically connected in parallel with the power load.

4. An apparatus according to claim 1, wherein the main switch and control circuit are controllable to divert current until a measured voltage across the condenser is within the predetermined range of the energy-storage device voltage.

5. An apparatus according to claim 1, wherein the main switch and control circuit are controllable to cease diversion of the current from passing through the main switch after the pre-charge period.

6. An apparatus according to claim 1, wherein the main switch and control circuit are controllable to continue to divert at least a portion of the current from passing through the main switch after the pre-charge period.

7. An apparatus comprising:
a switching circuit operable with an arrangement configured to effectuate a charging of an energy-storage device from a charging circuit including a condenser electrically connected in parallel with a power source, the switching circuit comprising:
a main switch electrically connectable to the condenser;
a control circuit electrically connected in parallel with the main switch, and electrically connectable to the condenser, the main switch and control circuit each being configured to independently, switchably pass current from the charging circuit to the energy-storage device, the respective current passing through either or both of the main switch or control circuit during the charging of the energy-storage device,
wherein the main switch and control circuit are controllable to pass current from the charging circuit to the energy-storage device, including being controllable to divert current from the charging circuit to the energy-storage device from passing through the main switch for a pre-charge period of the charging of the energy-storage device during which a voltage disparity between the energy-storage device and condenser of the charging circuit decreases to within a predetermined range.

8. An apparatus according to claim 7, wherein the control circuit comprises a second switch and resistor.

9. An apparatus according to claim 7, wherein the main switch is electrically connectable to the discharging circuit including a plurality of parallel-connected condensers electrically connected in parallel with the power source.

10. An apparatus according to claim 7, wherein the main switch and control circuit are controllable to divert current until the energy-storage device voltage is within the predetermined range of a measured voltage across the condenser.

11. An apparatus according to claim 7, wherein the main switch and control circuit are controllable to cease diversion of the current from passing through the main switch after the pre-charge period.

12. An apparatus according to claim 7, wherein the main switch and control circuit are controllable to continue to divert at least a portion of the current from passing through the main switch after the pre-charge period.

13. A method comprising:
electrically connecting an energy-storage device to a discharging circuit via a switching circuit and an arrangement configured to effectuate a discharging of the energy-storage device to the discharging circuit, the discharging circuit including a condenser electrically connected in parallel with a power load, the switching circuit comprising:
a main switch and a control circuit electrically connected in parallel, and electrically connected to the condenser, the main switch and control circuit each being configured to independently, switchably pass current from the power source to the condenser and energy-storage device, the respective current passing through either or both of the main switch or control circuit during the discharging of the energy-storage device; and
controlling the main switch and control circuit to pass current from the energy-storage device to the power load, including controlling the main switch and control circuit to divert current from the energy-storage device to the condenser from passing through the main switch for a pre-charge period of the discharging of the energy-storage device during which a voltage disparity between the condenser and energy-storage device decreases to within a predetermined range.

14. A method according to claim 13, wherein the control circuit comprises a second switch and resistor.

15. A method according to claim 13, wherein electrically connecting the energy-storage device comprises electrically connecting the energy-storage device to the discharging circuit including a plurality of parallel-connected condensers electrically connected in parallel with the power load.

16. A method according to claim 13, wherein controlling the main switch and control circuit includes controlling the main switch and control circuit to divert current until a measured voltage across the condenser is within the predetermined range of the energy-storage device voltage.

17. A method according to claim 13, wherein controlling the main switch and control circuit includes controlling the main switch and control circuit to cease diversion of the current from passing through the main switch after the pre-charge period.

18. A method according to claim 13, wherein controlling the main switch and control circuit includes controlling the main switch and control circuit to continue to divert at least a portion of the current from passing through the main switch after the pre-charge period.

19. A method comprising:
electrically connecting an energy-storage device to a charging circuit via a switching circuit and an arrangement configured to effectuate a charging of the energy-storage device to the charging circuit, the charging circuit including a condenser electrically connected in parallel with a power source, the switching circuit comprising:

a main switch and a control circuit electrically connected in parallel, and electrically connected to the condenser, the main switch and control circuit each being configured to independently, switchably pass current from the charging circuit to the energy-storage device, the respective current passing through either or both of the main switch or control circuit during the charging of the energy-storage device; and controlling the main switch and control circuit to pass current from the charging circuit to the energy-storage device, including controlling the main switch and control circuit to divert current from the charging circuit to the energy-storage device from passing through the main switch for a pre-charge period of the charging of the energy-storage device during which a voltage disparity between the energy-storage device condenser decreases to within a predetermined range.

20. A method according to claim 19, wherein the control circuit comprises a second switch and resistor.

21. A method according to claim 19, wherein electrically connecting the energy-storage device comprises electrically connecting the energy-storage device to the charging circuit including a plurality of parallel-connected condensers electrically connected in parallel with the power source.

22. A method according to claim 19, wherein controlling the main switch and control circuit includes controlling the main switch and control circuit to divert current until the energy-storage device voltage is within the predetermined range of a measured voltage across the condenser.

23. A method according to claim 19, wherein controlling the main switch and control circuit includes controlling the main switch and control circuit to cease diversion of the current from passing through the main switch after the pre-charge period.

24. A method according to claim 19, wherein controlling the main switch and control circuit includes controlling the main switch and control circuit to continue to divert at least a portion of the current from passing through the main switch after the pre-charge period.

* * * * *